Sept. 16, 1969 E. MOORE 3,467,949

MAGNETIC TAPE SEARCH UNIT

Filed April 6, 1965 5 Sheets-Sheet 1

Sept. 16, 1969 E. MOORE 3,467,949

MAGNETIC TAPE SEARCH UNIT

Filed April 6, 1965 5 Sheets-Sheet 3

Sept. 16, 1969 E. MOORE 3,467,949

MAGNETIC TAPE SEARCH UNIT

Filed April 6, 1965 5 Sheets-Sheet 4

Sept. 16, 1969 E. MOORE 3,467,949

MAGNETIC TAPE SEARCH UNIT

Filed April 6, 1965 5 Sheets-Sheet 5

United States Patent Office 3,467,949
Patented Sept. 16, 1969

3,467,949

MAGNETIC TAPE SEARCH UNIT

Earl Moore, Garland, Tex., assignor to Mobil Oil Corporation, a corporation of New York Filed Apr. 6, 1965, Ser. No. 445,889
Int. Cl. G11b 13/00
U.S. Cl. 340—172.5 9 Claims

ABSTRACT OF THE DISCLOSURE

The specification discloses an electronic device for use with a magnetic tape transport in locating a particular block or record of digital data on a magnetic tape having many blocks of data, each block including a unique identifying number. The desired record number is selected by a series of manually actuated switches. When the selected number is detected by the transport reading heads, the transport is stopped automatically. The disclosed device can be used to conserve digital computer operating time. While the computer is processing data from one tape transport operating on-line, another tape transport operating off-line can be used to pre-position the data next to be processed.

This invention relates to digital computer systems and more particularly to methods of and apparatus for locating particular records of data on a magnetic tape in a unit which is operating off-line from the computer.

In the operation of a digital computer it is quite important to make the most efficient use of the operating time of the computer itself. Since the computer performs actual computing operations at a very rapid rate, it frequently happens that the speed of data processing is restricted by the speed of operation of slower operating equipment and not by the speed of operation of the computer. For this reason, it has become a common technique to operate this slower equipment independently of the main computer. That is, units such as magnetic tape units, printers, and card readers are operated independently of the computer. When the operations performed by these units are complete, they are connected to the computer at the proper instant in the main digital computer program. At that time the accumulated information in the peripheral units can quickly be processed by the computer. This independent operation of peripheral units is usually referred to as operating the units off-line from the computer. When the units are connected to the computer they are operated on-line with the computer.

Generally, digital computer systems include a number of magnetic tape units. The most efficient use of computer operating time can be obtained by selectively connecting these magnetic tape units to the computer so that the computer can process selected records, or blocks of data words, recorded on the magnetic tape. Frequently, it is desired to process only selected ones of a great many records on a magnetic tape. This requirement of selecting a particular record frequently occurs in the processing of data obtained from a seismic exploration as will subsequently be explained.

In order to identify these particular records, identifying words are usually recorded on the tape adjacent to the record. These identifying words have a unique code which identifies a particular record. When a magnetic tape unit is connected on-line with a computer so that a particular record can be processed, it is quite wasteful of computer time if it is necessary for the computer to search through the identifying words to locate the proper record.

In accordance with one aspect of this invention there is provided an off-line search unit which performs the function of locating a desired record while the magnetic tape unit is operating off-line.

In accordance with another aspect of this invention, the off-line search unit includes circuitry which is responsive to the occurrence of a plurality of successive unique identifying words for stopping the magnetic tape transport at a particular record.

In accordance with another aspect of the invention, the off-line search unit includes circuitry for stopping the tape transport at either the unique identifying word at the beginning of a record or at the word which marks the end of the record.

In one embodiment of the nvention, the off-line search unit includes a plurality of two-state devices connected to reading heads in the magnetic tape unit. These reading heads sense the bits of words which are read by the magnetic tape unit. The two-state devices are set in accordance with the bits of these words. There is provided a means for selectively connecting the outputs of these two-state devices to a coincidence circuit so that the coincidence circuit will produce an output when a particular identifying word is read by the magnetic tape unit. The output of this coincidence circuit is connected to a stop circuit on the magnetic tape unit for stopping the tape transport at a particular record. In this manner the magnetic tape is stopped at a particular record so that this record can be processed when the magnetic tape unit is connected on-line with the computer.

The foregoing and other objects, features and advantages of the invention will be better understood from the following more detailed description and appended claims in conjunction with the drawings in which:

Figure 1:
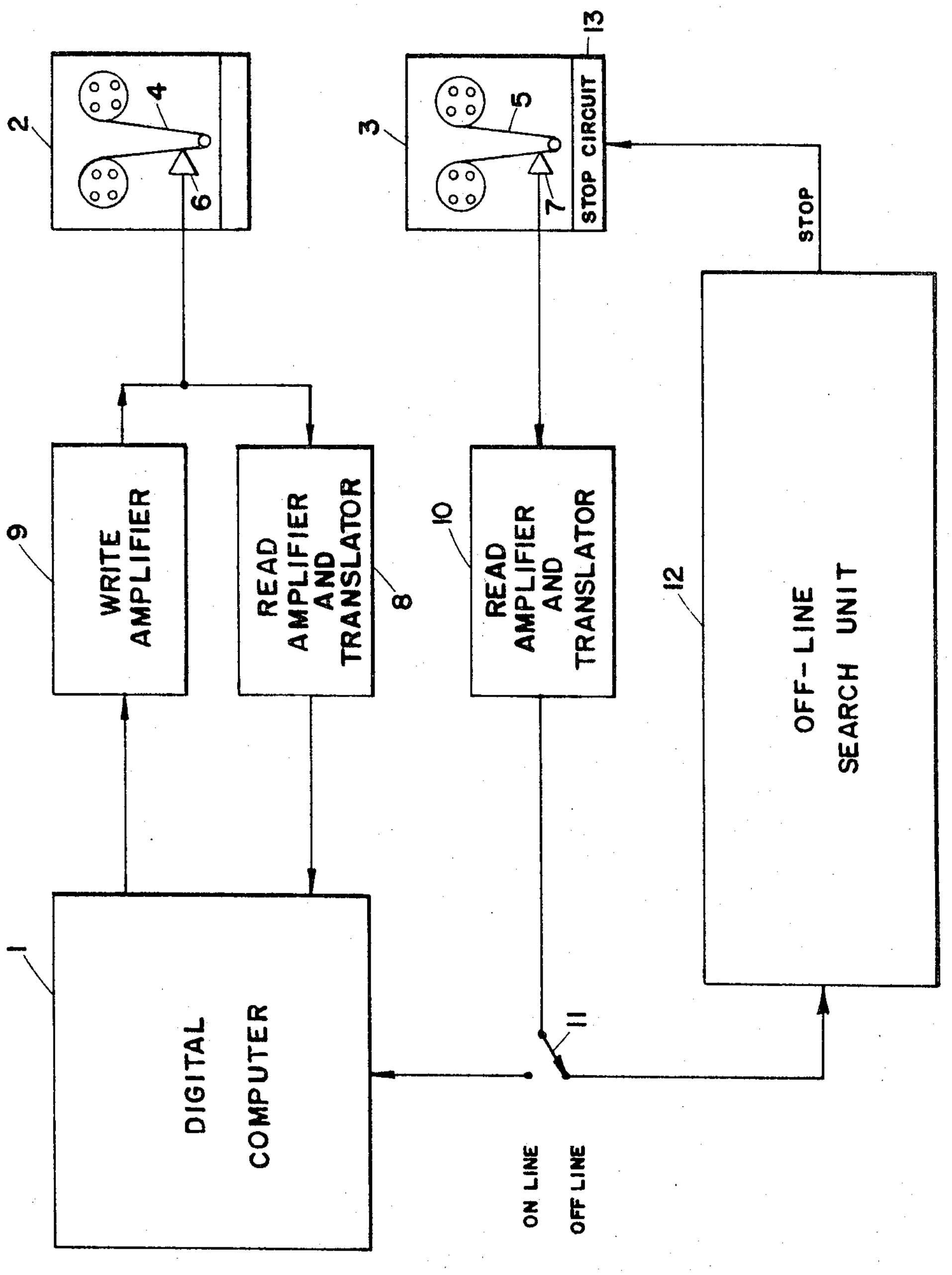
FIG. 1 is a block diagram of the computer system.

Referring now to FIG. 1 there is shown a digital computer 1 which may be any one of a number of well-known types. As one example, a Texas Instruments TIAC 827–C computer was used in a system operated in accordance with this invention. The system which includes such a computer will ordinarily have a number of peripheral units such as the tape units 2 and 3. Each of the tape units includes means for transporting a magnetic tape 4 and 5 past a plurality of transducer heads, denoted 6 and 7. These transducer heads 6 and 7 may be of the read/write type; that is, they are capable of either writing digital bits onto the magnetic tape or reading the digital bits from the magnetic tape.

Figure 2:
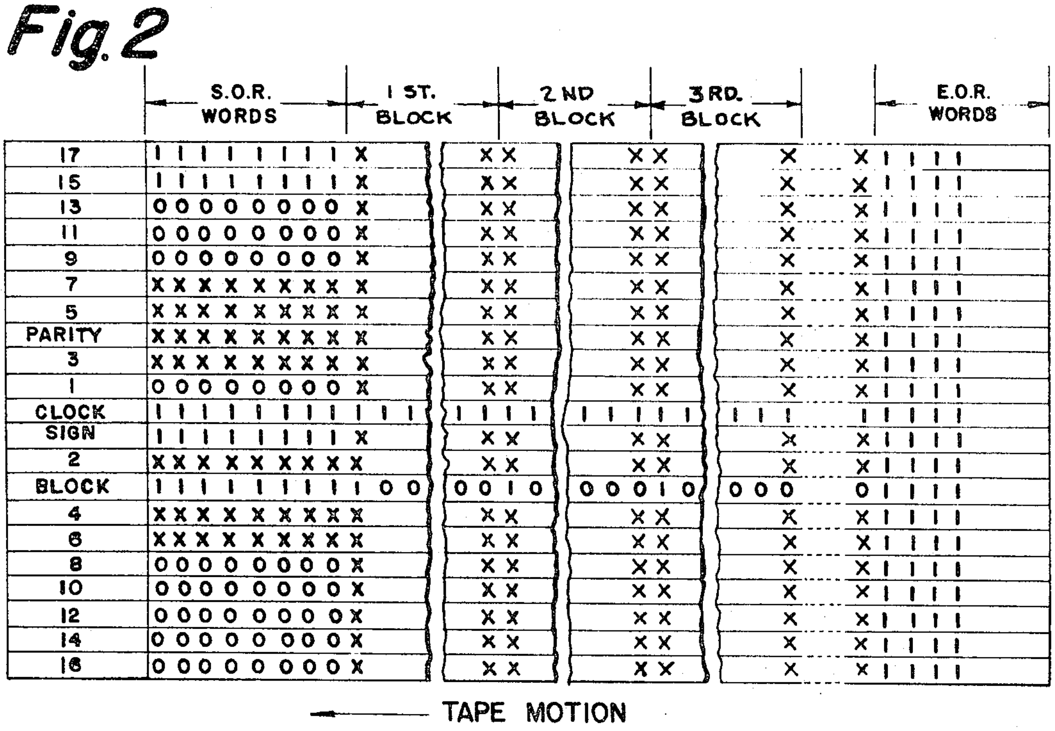
FIG. 2 shows the format of the magnetic tape in accordance with one embodiment.

It will be understoood that the transducer heads denoted generally 6 or 7 in FIG. 1 are in reality a plurality of separate transducer heads one for each of the channels shown in the tape format of FIG. 2. That is, there will be a pickup head associated with each of channels 1–17 and one transducer head associated with each of the parity, clock, sign and block channels.

The transducer heads 6 are connected through read amplifier and translator 8 to the digital computer 1. The computer 1 is also connected through write amplifier 9 to the transducer heads 6 so that data may be written on the magnetic tape 4.

Magnetic tape unit 3 similarly has a read amplifier and translator 10 for connecting the outputs of the transducer heads 7 to the computer. In the embodiment shown the read translators produce negative pulses in response to the reading of 1 bits on the magnetic tape. They produce no pulse output when a 0 bit is read. Many different coding systems may be used in the recording of bits on the magnetic tape. One coding system which has actually been used successfully is the return to zero system. The write amplifier for the tape unit 3 has not been shown in FIG. 1.

In order to make the optimum use of computer time, means are provided for operating the magnetic tape unit 3 off-line from the computer while the computer is operating in conjunction with other peripheral equipment or is performing computations. The transducer heads 7 are shown connected through read amplifier and translator 10 and through a switch 11 to the computer. The switch 11 has been diagrammatically shown to illustrate the function of switching the tape unit 3 between on-line operation and off-line operation.

In accordance with one aspect of this invention there is provided an off-line search unit 12 for locating a particular record on the tape 5. By locating a particular record while the tape unit 3 is operating off-line, there is conserved valuable computer time which might otherwise be wasted in locating this record during the on-line operation of the magnetic tape unit 3. This off-line search unit will be subsequently described in detail. As diagrammatically shown in FIG. 1, the transducer heads 7 are connected through read amplifier 10 and the switch 11 to the off-line search unit. This off-line search unit is responsive to a particular selected identifying word which is associated with the record which it is desired to read. When the off-line search unit 12 detects this particular identifying word, a stop signal is applied to the stop circuit 13. This stops the tape transport at the desired record. Therefore, when the tape unit 3 is switched on-line with the computer, the magnetic tape 5 is in the proper position for the transducer heads 7 to immediately begin reading the desired data words which are applied to the digital computer 1 for processing.

Before proceeding with the description of the off-line search unit, there will first be described an exemplary format for the magnetic tapes which may be processed on the magnetic tape units. As shown in FIG. 2, each recorded word includes 21 bits or channels. These are specified as bits 1 through 17, the parity bit, the clock bit, the sign bit, and the block bit. The bits, or channels, 1–17 each have recorded therein a 1 or a 0 to make up data words, start-of-record words (S.O.R.) or end-of-record words (E.O.R.). In FIG. 2, a 1 or a 0 in a particular bit position denotes a particular state of magnetization on the tape while an X in a bit position denotes that the bit can be either a 1 or a 0.

As shown in FIG. 2, there are 32 words in a block of data. A plurality of blocks of data makes up a record. Start-of-record words are recorded at the beginning of the record and end-of-record words are recorded at the end of the record.

As has been previously mentioned, the system of this invention is particularly suitable for use in processing tapes on which have been recorded digital words for presenting seismic exploration data. One suitable system for obtaining and recording these tapes is disclosed in "Hybrid Seismic Processing System," inventor, G. D. Koeijmans, filed Dec. 29, 1964, Ser. No. 425,668.

The field data includes digital data from a plurality of geophone stations. The seismic signal from each geophone station is referred to as a trace. In the recording system a block of data words is recorded. Each data word represents a sample of a seismic signal from a particular trace. For example, assume there are twenty-four traces. Then, twenty-four of the data words in each block will respectively represent the first sample from each of the traces. Then the next block of data words is recorded representing the second sample from the same traces. There are a great number of blocks of data words which collectively represent the seismogram obtained from each of the geophone stations. It will be appreciated that it is often desirable to process only a selected seismogram. Therefore, it is necessary to search through all of the records to locate the particular record at which processing is to commence. The present invention provides such a capability while the tape unit is operating off-line from the computer.

The clock bit has a succession of 1's recorded therein coincidentally with each recorded word for timing purposes. The sign channel contains bits specifying the sign of data words, the parity channel contains bits for checking the accuracy of recorded information, and the block channel contains bits which distinguish data words from S.O.R., E.O.R., and block words by the recording therein of 0 bits and 1 bits.

Preceding each record, and recorded immediately adjacent to the record, is a group of unique identifying words which are referred to as start-of-record, S.O.R. words. These S.O.R. words are distinguished from data words by the fact that the clock, sign, and block channels all contain 1 bits and channel 1 contains all 0's. The unique S.O.R. word identifying a particular record occupies channels 2 through 17. These channels represent the highest order bit to the lowest order bit in the words respectively, that is, channel 2 is the highest order bit in an S.O.R. word and channel 17 is the lowest order bit.

Although the channels have not been shown in the correct order on the tape format of FIG. 2, it will be appreciated that this is a matter of choice. As an example, consider the code for identifying the record which bears the decimal number 5. In binary notation a decimal number 5 is a 1 in the least significant bit, a 0 in the next significant bit and a 1 in the next significant bit with all remaining bits being 0. As shown in FIG. 2, there is a series of 1's in channel 17, the least significant bit position, a succession of 0's in channel 16, the next significant bit position, and a series of 1's in channel 15, the next significant bit position. All remaining channels through channel 8 contain 0's. In this manner there has been identified the record denoted decimal number 5.

At the end of each record there are recorded in all channels a plurality of end-of-record words, denoted E.O.R. These end-of-record words comprise 1's in all channels as shown in FIG. 2.

In describing the logic circuit diagram of the off-line search unit, the following logic notation will be used. All two-state devices, that is, monostable multivibrators and bistable flip-flops, will be referred to as having a true side and a complement side, respectively denoted T and C. A 1 bit is represented by a −6 volt level and a 0 bit is represented by a 0 volt level. When a flip-flop is in the true condition, the output on the true side is −6 volts, a 1 level, and the output on the complement side is 0 volts, a 0 level. When a flip-flop is in the complement condition, the output on the true side is 0 volts, a 0 level, and the output on the complement side is −6 volts, a 1 level. When a monostable multivibrator is set to the quasi-stable state, the output on the true side is −6 volts, a 1 level, and the output on the complement side is 0 volts, a 0 level.

Figure 3:
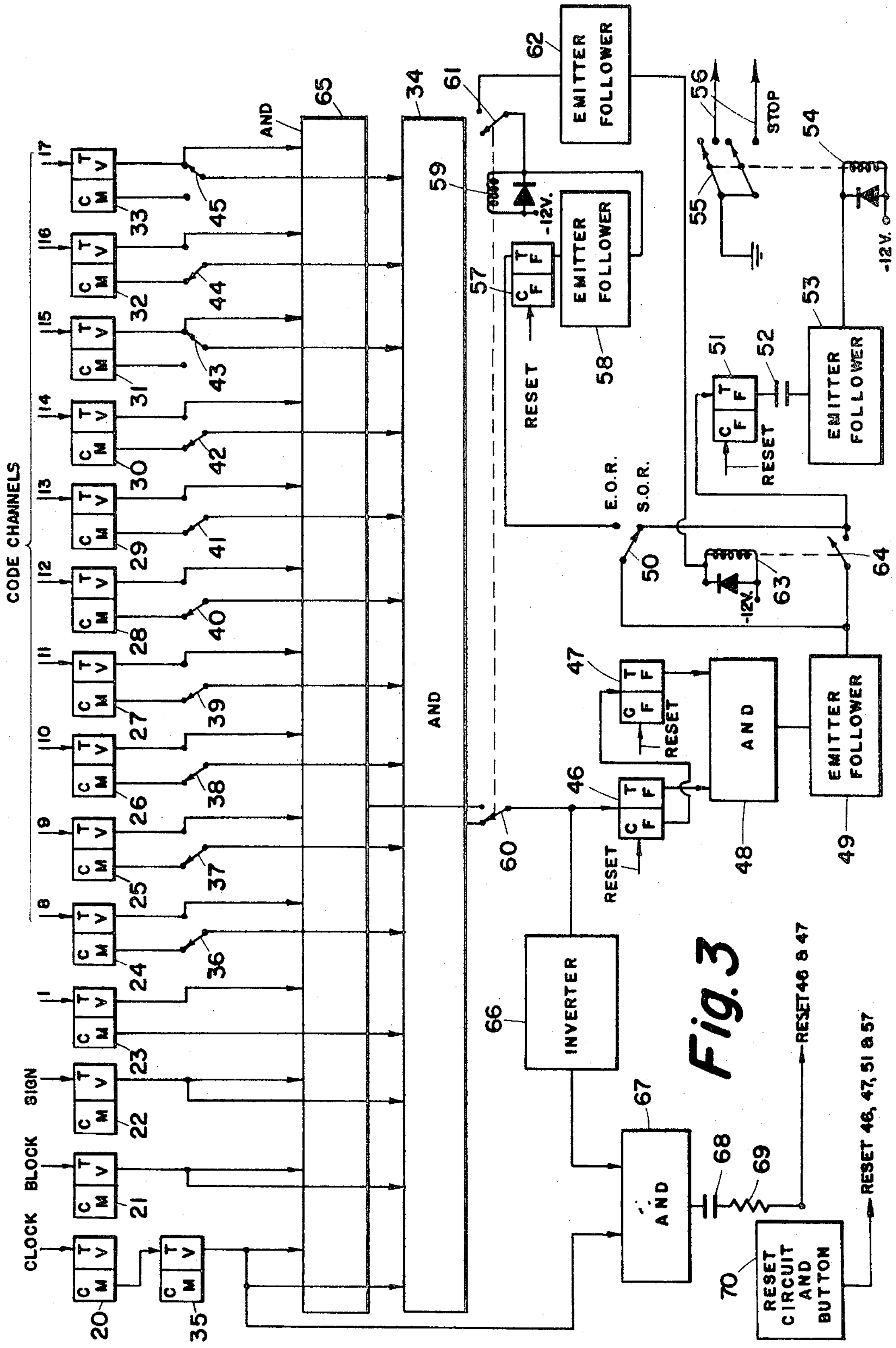
FIG. 3 shows a block logic diagram of the off-line search unit.

Referring now to FIG. 3 there is shown a plurality of two-state devices 20–33. These two-state devices are monostable multivibrators which have their inputs connected to the transducer heads associated with each of the channels on a magnetic tape unit. As shown, the input to multivibrator 20 is connected to the transducer associated with the clock channel, the input to multivibrator 21 is connected to the transducer head associated with the block channel, the input to multivibrator 22 is connected to the transducer head associated with the sign channel, and so on.

The connections between the transducer heads and the monostable multivibrators are such that when a 1 bit is read by the transducer head in the channel, the associated multivibrator is set to its quasi-stable state. In this condition the output of the true side of the multivibrator will have a 1 level thereon and the output on the complement side will have a 0 level thereon. The outputs from the monostable multivibrators 20–33 are applied to a coincidence circuit or AND-gate 34. The outputs from the true side of multivibrators 21 and 22 are applied directly to AND-gate 34. The output from the complement side of monostable multivibrator 23 is applied directly to AND-gate 34. The output from the complement side of multivibrator 20 is applied to the input to the monostable multivibrator 35. The output from the true side of multivibrator 35 is applied to AND-gate 34.

In order to provide means for selecting the start-of-record word associated with the particular record at which the tape transport is to stop, a plurality of switches 36–45 are provided. These switches connect either the true side output or the complement side output of multivibrators 24–33 to the AND-gate 34. These switches provide means for selectively applying the outputs of the two-state devices 20–33 to the AND-gate 34 so that there is an output from this circuit upon the reading of a selected one of the start-of-record words.

The output of AND-gate 34 is applied to a counter which will count a predetermined number of start-of-record words before actuating the stop circuit on the tape transport. This counter includes the bistable flip-flops 46 and 47. The counter including flip-flops 46 and 47 will count the occurrence of three selected start-of-record words before applying to AND-gate 48 voltages which enable AND-gate 48 to apply a pulse through emitter follower 49 and through switch 50 to set flip-flop 51 to the true condition. When flip-flop 51 is set to the true condition, the output on the true side switches to a −6 volts thereby applying a short negative pulse through capacitor 52 and emitter follower 53 to the relay coil 54. When relay coil 54 is energized, the relay contacts 55 are closed to momentarily apply ground potential to the lines 56 which are connected to the stop circuit of the tape transport.

As one example of a magnetic tape unit having stop circuitry suitable for use with the embodiment of the invention shown, reference is made to an Ampex TM–2 tape unit.

There will now be described the circuitry for stopping the transport of the tape upon the occurrence of an end-of-record word which is adjacent to a block of data having a particular start-of-record word. Again, the switches 36–45 are set to produce coincidence at the AND-gate 34 upon the reading of the particular start-of-record word. However, now, the switch 50 is set to the E.O.R. position.

When the AND-gate 34 produces three output pulses indicating the occurrence of three successive desired S.O.R. words, the flip-flops 46 and 47 will both be set to the true condition. The outputs from flip-flops 46 and 47 are applied to AND-gate 48 producing a coincidence pulse which is connected to emitter follower 49, and through the E.O.R. position of switch 50 to set flip-flop 57 to the true condition. The output on the true side of flip-flop 57 is connected through emitter follower 58 to energize the relay coil 19 thereby actuating the contacts 60 and 61. The closing of contact 61 applies ground potential through emitter follower 62 to the relay coil 63. This energizes the relay coil 63 thereby closing the contact 64.

When the end-of-record words at the end of this block of data are read, these end-of-record words are detected by a second coincidence circuit, the AND-gate 65. The output on the true sides of multivibrators 21–33 are connected directly to AND-gate 65. Therefore, when the E.O.R. words, which are all 1 bits, are read, then the inputs to AND-gate 65 will all be 1's. This will produce a pulse at the output of AND-gate 65. This pulse will be connected through contact 60 to the counter made up of flip-flops 46 and 47. When the counter has counted three successive E.O.R. words, the AND-gate 48 will be enabled and a pulse from this AND-gate will be coupled through emitter follower 49 and through contact 64 to set the flip-flop 51 to its true condition. When this occurs, the output on the true side of flip-flop 51 switches to −6 volts thereby applying a negative pulse through capacitor 52 and emitter follower 53 to the relay coil 54. This stops the tape transport at the desired location as previously described.

The reset circuitry which includes inverter 66 and AND-gate 67 will now be described. The input to inverter 66 is from the contact 60. In the absence of an S.O.R. word of the selected type a 0 level is applied to the inverter 66. This 0 level is inverted to a 1 level which is applied to AND-gate 67. The monostable multivibrator 20 is triggered upon the occurrence of each clock pulse. It will be remembered that the clock channel contains a 1 bit for every word recorded on the tape. These successive 1 bits energize monostable multivibrator 20 which in turn energizes monostable multivibrator 35. Therefore, every clock pulse is applied to AND-gate 67 and as long as this AND-gate is enabled the clock pulses pass through AND-gate 67 and through capacitor 68 and resistor 69 to apply a reset pulse to flip-flops 46 and 47.

When a selected S.O.R. word is detected, a 1 level will be applied to inverter 66 and a 0 level will be applied to AND-gate 67 thereby inhibiting the production of these reset pulses. Similarly, when the contact 60 is actuated to its right hand position and E.O.R. words are being detected, the AND-gate 67 will be inhibited and no reset pulses will be produced. A reset circuit and button 70 is provided to manually apply a reset pulse to all of the flip-flops.

The operation of the multivibrators 20 and 35 in applying clock pulses to AND-gates 34 and 65 will now be described. It will be appreciated that there may be tape skew or other reasons for variation in the occurrence times of the bits read from the tapes and applied to multivibrators 22–33. Because of this it is desirable to use the clock pulses to achieve exact timing.

Figure 4:
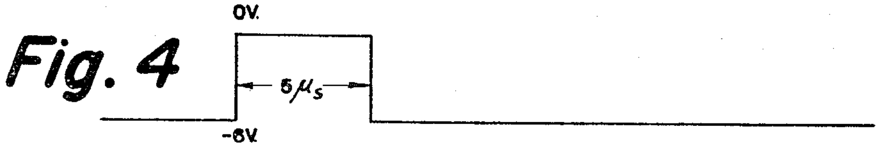
FIGS. 4, 5 and 6 show wave forms depicting the operation of the search unit.
Figure 5:
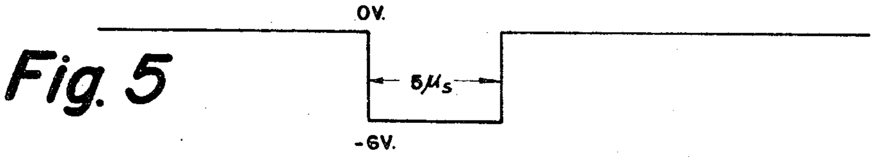

In order to do this, the clock pulses are applied to multivibrator 20 which switches to its quasi-stable state for a time period of 5 microseconds. This is shown in FIG. 4. When the multivibrator returns to its stable state, that is, when the output on the complement side switches from zero volts to −6 volts, the multivibrator 35 is switched to its quasi-stable state. As shown in FIG. 5, the multivibrator 35 remains in its quasi-stable state for a time period of 5 microseconds.

Figure 6:
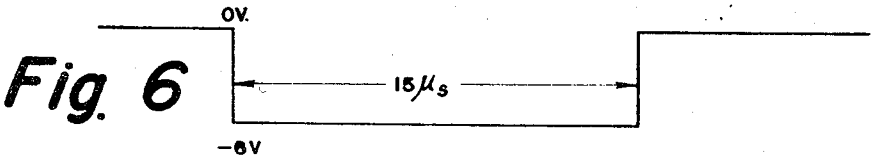

The multivibrators 21–33 have a quasi-stable state which is approximately 15 microseconds long, as shown in FIG. 6. Therefore, the 5 microsecond pulse from multivibrator 35 occurs approximately in the center of the pulses from the other multivibrators. Therefore, there is enough overlap between the clock channel pulse from multivibrator 35 and the pulses from the multivibrators 21–33 to produce coincidence at AND-gates 34 and 65 even though there may be slight variations in the times at which the bits are read from the tape.

Operation of off-line search unit

Now that the details of the off-line search unit have been described, there can now be described one example of the operation of the system. Consider as an example the situation in which it is desired to have the off-line search unit 12 search for the record identified by a start-of-record word having a decimal value of 5. That is, the desired record will be identified by start-of-record words having in binary notation a 1 bit in channel 17, a 0 bit in channel 16, a 1 bit in channel 15, and 0's in the remainder of the channels 8–14. As shown in FIG. 2, there are eight such S.O.R. words at the beginning of the record.

The off-line search unit is set to detect the occurrence of at least three successive S.O.R. words indicating the record 5 as follows. The switch 45 is set to the right hand position to detect a 1 in channel 17 and the switch 43 is set to the right hand position to detect the presence of a 1 in channel 15. The remainder of the switches 36–42 and 44 are set to the left hand position to detect the presence of a 0 in channels 8–14 and 16.

When the first of the eight recorded S.O.R. words is detected by the reading heads, the reading head associated with channel 17 sets multivibrator 33 to the quasi-stable condition because of the 1 bit recorded in channel 17. Similarly, multivibrator 31 is set to the quasi-stable condition because of the 1 bit recorded in channel 15. The remainder of multivibrators 23–30 and 32 will not be triggered to their quasi-stable states because of the 0's recorded in the channels 1 and 8–14 and 16. Multivibrators 21 and 22 will be switched to their quasi-stable states because of the 1 bits recorded in the block and the sign channels. Therefore, the outputs of multivibrators 21–33 which are applied to AND-gate 34 will all be at the 1 level. In response to the 1 bit in the clock channel, the multivibrator 20 is set to the quasi-stable state and 5 microseconds later multivibrator 35 is switched to the quasi-stable state. This results in the application of a 1 level to AND-gate 34. Since all of the inputs to AND-gate 34 are at the 1 level, there is produced a pulse at the output of this AND-gate. This pulse sets flip-flop 46 to the 1 level thereby registering a 1 in the counter including flip-flops 46 and 47.

Upon the reading of the next S.O.R. word having this particular code, there will again be produced at the output of AND-gate 34 a pulse which sets flip-flop 46 to the complement condition and sets flip-flop 47 to the true condition thereby registering a 2 in the counter. The next S.O.R. word having this particular bit configuration will again produce a pulse at the output of AND-gate 34 which sets flip-flop 46 to the true condition. Since flip-flops 46 and 47 are now both in the true condition, AND-gate 48 will be enabled to pass a pulse through emitter follower 49 and through switch 50 to set flip-flop 51 to the true condition. This energizes the stop circuit and the tape is stopped at the selected record.

When the switch 50 is placed in the E.O.R. position so that the tape will be stopped at the end of a selected record instead of at the beginning, the preceding operation is the same insofar as the recognition of at least three S.O.R. words of the specified type. However, when AND-gate 48 is enabled this time, the pulse will pass through emitter follower 49 and the E.O.R. contact of switch 50 to set flip-flop 57 to the true condition. This energizes relay 59. The relay coil 59 actuates the contact 60 to the right hand position and relay contact 61 to the right hand position. Relay contact 61 applies an energizing potential to relay coil 63, resulting in the closing of contact 64.

Now, upon the occurrence of the E.O.R. words at the end of the record, the AND-gate 65 will be enabled because of the 1 conditions applied from the tape to the multivibrators 20–33. The pulse output from AND-gate 65 will pass through contact 60 to set the counter. When three such pulses have been counted, AND-gate 48 will be enabled and the pulse therefrom will pass through emitter follower 49 and the closed contacts of contact 64 to set flip-flop 51 to the true condition. This energizes the stop circuit as before. In this mode of operation the tape is stopped at the end of the selected record.

In either mode of operation, the tape is stopped at a selected record so that when the tape unit is next connected to operate on-line with the computer there will be ready for the computer the records which are to be processed. This results in considerable saving in computer time.

There will now be described particular circuits which are suitable for use in implementing the logic circuits of FIG. 3. It will be understood that the particular circuits are given by way of example only and are in no way to be considered limiting of the invention.

Monostable multivibrator

Figure 7:
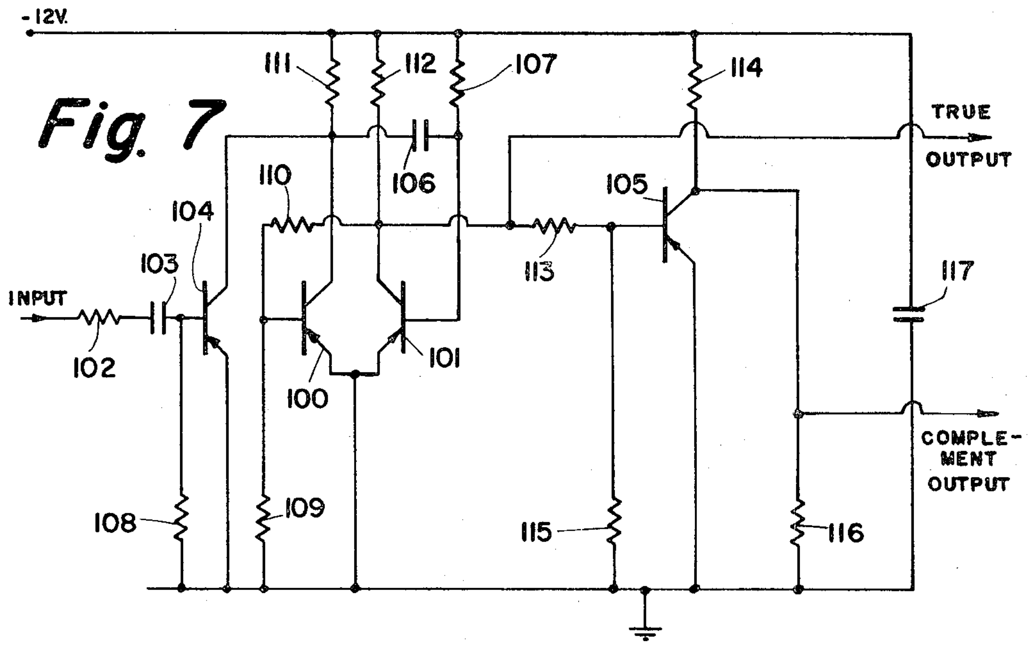
FIG. 7 shows a circuit diagram of a monostable multivibrator suitable for use in the invention.

A circuit which is suitable for use as the multivibrators 20–33 is shown in FIG. 7. The circuit shown in FIG. 7 includes two transistors 100 and 101, the transistor 100 being normally biased to cut-off and the transistor 101 being normally biased for conduction.

The output from one transducer head is applied as an input to the monostable multivibrator through resistor 102, capacitor 103 and the input transistor 104. When a 1 bit is read, a negative input pulse is applied to the base of transistor 104. This results in the application of a positive pulse to the collector of transistor 100 and to the base of transistor 101 thereby tending to turn transistor 100 on and to cut transistor 101 off. The switching of the conducting states of transistors 100 and 101 will be completed by the regenerative action caused by the emitter coupling and by the coupling from the collector of transistor 101 to the base of transistor 100. When transistor 101 is cut off and transistor 100 is conducting, the multivibrator is in what has been referred to as the quasi-stable state. In this condition, the collector of transistor 101 will be at about −6 volts. This −6 volt level is a level which is applied to the true output of the multivibrator.

The voltage on the collector of transistor 101 is also applied to an output transistor 105. The negative voltage applied to the base of transistor 105 results in this transistor being turned on fully. There is thus developed at the collector of transistor 105 a 0 volt level which is applied to the complement output of the multivibrator.

The monostable multivibrator will remain in its quasi-stable state for a period of time determined by the time constant of the circuit including capacitor 106 and resistor 107. As the charge on capacitor 106 leaks off through resistor 107, the transistor 101 will again begin to conduct. When transistor 101 begins to conduct, regenerative action will cause transistor 100 to be cut off. The transistors will return to their normal states in which transistor 100 is cut off and transistor 101 is conducting.

As one example of particular circuit values which may be used in the circuit of FIG. 7, reference is made to the following table. It will be understood that these circuit values are given by way of example only and may be changed to provide a monostable multivibrator with a different time constant.

Table of component values (FIG. 7)

| | | | |
|---|---|---|---|
| Transistors: | **100** | | 2N1305 |
| | **101** | | 2N1305 |
| Resistor | **102** | | 3.3K |
| Capacitor | **103** | microfarads | .001 |
| Transistors: | **104** | | 2N1305 |
| | **105** | | 2N1305 |
| Capacitor | **106** | microfarads | .0068 |
| Resistors: | **107** | | 10K |
| | **108** | ohms | 56K |
| | **109** | do | 2.2K |
| | **110** | do | 680 |
| | **111** | do | 910 |
| | **112** | do | 510 |
| | **113** | | 3.3K |
| | **114** | ohms | 910 |
| | **115** | do | 510 |
| | **116** | do | 910 |
| Capacitor | **117** | microfarad | .1 |

The circuit for flip-flops 51 and 57

Figure 8:
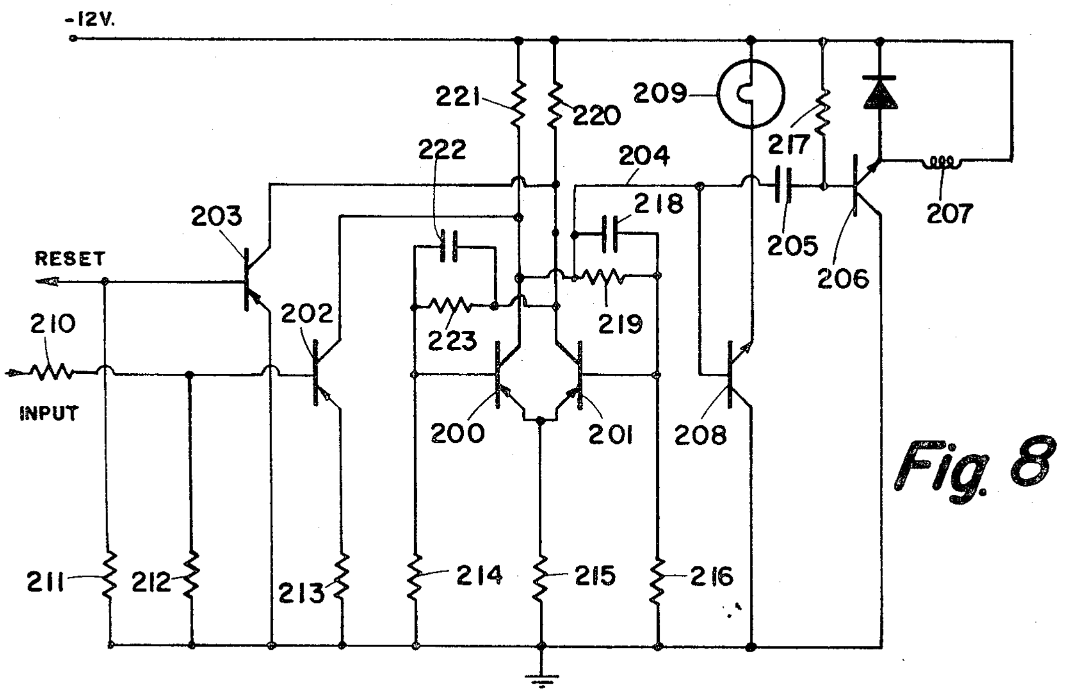
FIG. 8 shows a circuit diagram of a bistable multivibrator (flip-flop) suitable for use in the invention.

FIG. 8 shows the circuit for a flip-flop which can be used in the tape search unit of FIG. 3. (There will be described the circuit for the flip-flop 51 in FIG. 3. From this description the principles applicable to the flip-flop 57 in FIG. 3 will be understood.)

The circuit includes transistors 200 and 201, the transistor 200 being normally biased to cut-off and the transistor 201 being normally biased to conduction.

Negative input pulses to the circuit are applied to the base of transistor 202. There will be produced at the collector of transistor 202 a positive pulse which is applied to the collector of transistor 200 and to the base of transisor 201. This ends to turn on transistor 200 and to cut off transistor 201. This switching of conductivity states is completed by regenerative action caued by the common emitter coupling and by the coupling from the collector of transistor 201 to the base of transistor 200.

The flip-flop circuit will remain in the condition in which transistor 200 is conducting and transistor 201 is cut off until a reset pulse is applied to the circuit.

When a negative reset pulse is applied to the base of transistor 203 there will be developed a positive pulse at the collector of transistor 203. This positive pulse is applied to the collector of transistor 201 and to the base of transistor 200. This tends to cut transistor 200 off and turn transistor 201 on. Again, the switching of the conductivity states of the transistors will be completed by regenerative action.

The output on the true side of the flip-flop is taken from the collector of transistor 200 and is indicated by the reference numeral 204. The true side output is applied through a capacitor 205 to a transistor 206 connected as an emitter follower. The emitter of transistor 206 is connected to relay coil 207 to energize that coil. The transistor 206 corresponds with the emitter follower 53 in FIG. 3 and the relay coil 207 corresponds with the relay coil 54 in FIG. 3.

A transistor 208 has its base connected to the true side output. Connected to the emitter of transistor 208 is a pilot lamp 209 which, when energized, indicates that the flip-flop is in the true condition.

The following table of typical circuit values is given by way of example.

Table of component values (FIG. 8)

| | | | |
|---|---|---|---|
| Transistors: | **200** | | 2N1305 |
| | **201** | | 2N1305 |
| | **202** | | 2N1305 |
| | **203** | | 2N1305 |
| Capacitor | **205** | microfarads | .0015 |
| Transistor | **206** | | 2N1304 |
| Relay | **207** | | GE 3S2791G200A6 |
| Transistor | **208** | | 2N1304 |
| Pilot lamp | | | #327 |
| Resistors: | **210** | | 15K |
| | **211** | | 15K |
| | **212** | | 10K |
| | **213** | | 1K |
| | **214** | | 2.2K |
| | **215** | ohms | 47 |
| | **216** | | 2.2K |
| | **217** | | 10K |
| Capacitor | **218** | microfarads | .0015 |
| Resistors: | **219** | | 10K |
| | **220** | | 1K |
| | **221** | | 1K |
| Capacitor | **222** | microfarads | .0015 |
| Resistor | **223** | ohms | 10K |

Complementary flip-flop

Figure 9:
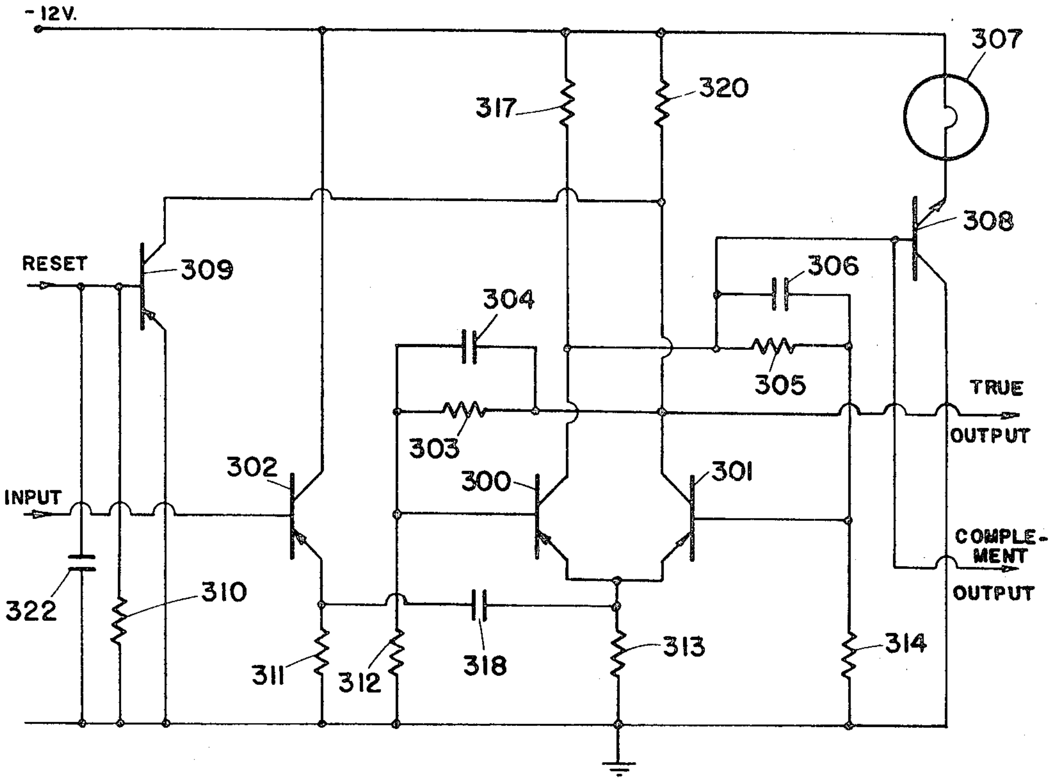
FIG. 9 shows a circuit diagram of a complementary bistable multivibrator suitable for use in the invention.

The flip-flops such as the flip-flops 46 and 47 in FIG. 3 can be implemented with a circuit of the type shown in FIG. 9. This circuit includes transistors 300 and 301. Negative input pulses are coupled through emitter follower transistor 302 to the common emitters of transistors 300 and 301.

Assume initially that transistor 301 is conducting and transistor 300 is cut off. The negative pulse at the emitter of transistor 301 tends to cut this transistor off. When this occurs, there is developed a negative-going voltage at the collector of transistor 301. This negative-going voltage is coupled through resistor 303 and capacitor 304 to the base of transistor 300. This negative-going voltage at the base of transistor 300 tends to turn that transistor on. The switching action is regenerative because of the common emitter coupling and because of the coupling from the collector of one transistor to the base of the other transistor. Therefore, the conducting states switch so that transistor 300 is conducting and transistor 301 is cut off.

The next negative-going input pulse, applied to the emitters of both transistors 300 and 301, will tend to cut transistor 300 off. This will produce a negative-going voltage at the collector of transistor 300 which is coupled through resistor 305 and capacitor 306 to the base of transistor 301 tending to turn that transistor on. As before, the action is regenerative and again the conducting states of the transistors will be switched. In this type of circuit the conducting states of the transistors are switched for each negative input pulse. The true side output is connected to the collector of transistor 301 while the complement side output is connected to the collector of transistor 300. In order to indicate the state of the flip-flop, a pilot lamp 307, connected in the emitter circuit of transistor 308 is provided. The pilot lamp 307 will be energized when the flip-flop is in the true condition.

In order to reset the flip-flop to the complementary condition, reset pulses are applied through transistor 309 to the collector of transistor 301.

A table of representative circuit values for the circuit of FIG. 9 is given below.

| | | | |
|---|---|---|---|
| Transistors: | **300** | | 2N1305 |
| | **301** | | 2N1305 |
| | **302** | | 2N1305 |
| Resistor | **303** | ohms | 10K |
| Capacitor | **304** | microfarads | .0015 |
| Resistor | **305** | ohms | 10K |
| Capacitor | **306** | microfarads | .0015 |
| Pilot lamp | **307** | | #327 |
| Transistors: | **308** | | 2N1304 |
| | **309** | | 2N1305 |
| Resistors: | **310** | ohms | 22K |
| | **311** | do | 3.3K |
| | **312** | do | 2.2K |
| | **313** | do | 91 |
| | **314** | do | 2.2K |
| | **317** | do | 1K |
| Capacitor | **318** | microfarads | .0068 |
| Resistor | **320** | ohms | 1K |
| Capacitor | **322** | micromicrofarads | 750 |

The inverter

Figure 10:
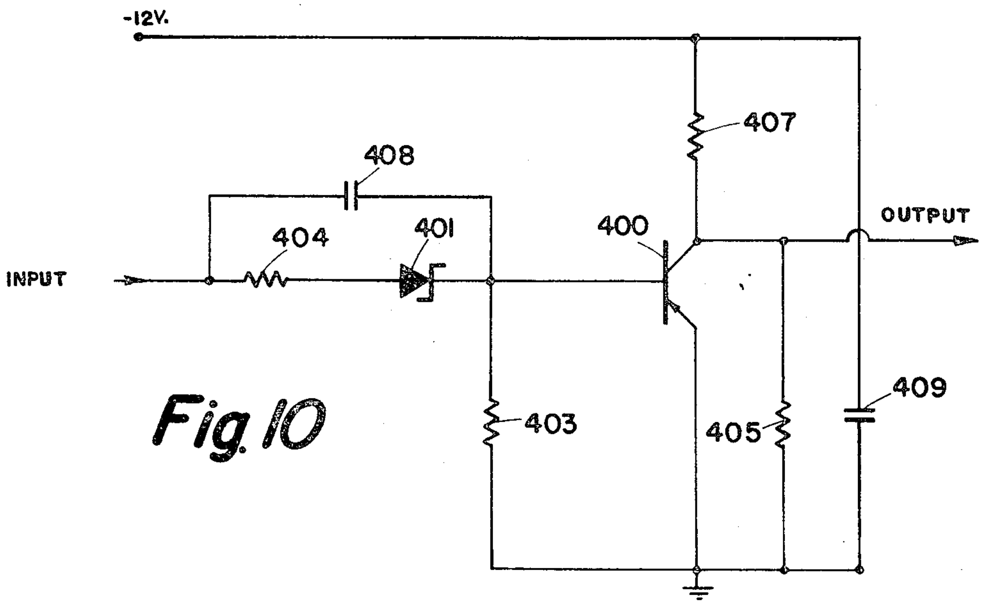
FIG. 10 shows a circuit diagram of an inverter circuit suitable for use in the invention.

The inverter 66 in FIG. 3 may take the form shown in FIG. 10. The inverter includes a transistor 400 connected in a grounded emitter configuration. A Zener diode 401 is connected between the input and the base of transistor 400 to provide a step voltage input to transistor 400 to insure instantaneous switching.

In the absence of a voltage on the input line, transistor 400 is non-conductive, and an output of —6 volts is developed on the collector of transistor 400. When a negative input pulse is applied to the input line, transistor 400 conducts. As a result a zero volt level is applied to the output.

Table of component values (FIG. 10)

| | | | |
|---|---|---|---|
| Transistor | **400** | | 2N1305 |
| Zener diode | **401** | | 1N796 |
| Resistors: | **403** | ohms | 10K |
| | **404** | do | 10K |
| | **405** | do | 22K |
| | **407** | do | 22K |
| Capacitors: | **408** | micromicrofarads | 200 |
| | **409** | microfarad | .1 |

While a particular embodiment of the invention has been shown and described, it will, of course, be understood that various modifications may be made without departing from the principles of the invention. The appended claims are, therefore, intended to cover any such modification within the true spirit and scope of the invention.

What is claimed is:

1. A digital computer system of the type including a digital computer and at least first and second peripheral units each having a plurality of parallel reading heads for reading records of data words recorded on a magnetically reproducible medium between unique identifying words which are recorded on parallel tracks, said system comprising:

means for operating one of said peripheral units off-line from said computer, a first coincidence circuit, switch means connected in circuit between said parallel reading heads and said first coincidence circuit and operable during the time that said one peripheral unit is operating off-line from said computer for applying the outputs of selected ones of the reading heads of said one peripheral unit to said first coincidence circuit so that said first coincidence circuit produces an output upon the reading of a selected one of said identifying words, and a stop circuit for said one peripheral unit, the output of said first coincidence circuit being connected to said stop circuit for stopping said reproducible medium at a particular record so that said record can be processed by said computer when said off-line peripheral unit is connected to operate on-line with said computer.

2. The system recited in claim 1 and a counter, the output of said first coincidence circuit being applied to said counter, the output of said counter being connected to said stop circuit so that said reproducible medium is stopped only after the occurrence of a predetermined number of successive identifying words.

3. The system recited in claim 1 wherein said identifying words include start-of-record words, each uniquely identifying a particular record and recorded at the beginning of the records with normal tape movement, and end-of-record words recorded at the end of the records with normal tape movement, said end-of-record words all being of like character, said system further including circuitry for stopping said reproducible medium at the end of a particular record, comprising:

a second coincidence circuit, means for applying the outputs of selected ones of the reading heads of said one peripheral unit to second coincidence circuit so that said second coincidence circuit produces an output upon the reading of said end-of-record words, and means connected to the outputs of said first and said second coincidence circuits for stopping said reproducible medium upon the occurrence of an end-of-record word after the occurrence of a particular start-of-record word.

4. A digital computer system for processing selected records of multi-bit digital data words recorded on magnetic tapes, said magnetic tapes having identifying words recorded thereon adjacent each record, said system comprising:

a digital computer, at least first and second peripheral magnetic tape units each including:

a tape transport for transporting said tapes, a plurality of reading heads disposed in reading relationship with a tape which is being transported, and a stop circuit for stopping said tape at a particular record, means for selectively connecting said magnetic tape units to said computer so that each of said magnetic tape units can operate on-line with said computer or off-line with said computer, at least one off-line search unit associated with a magnetic tape unit which is operating off-line, said off-line search unit including:

a plurality of two-state devices, each connected to one of said reading heads so that each one of said two-state devices is set to a particular state in accordance with a particular bit of words being read from said magnetic tape, a first coincidence circuit, and means for selectively applying the outputs of said two-state devices to said first coincidence circuit so that said first coincidence circuit produces an output upon the reading of a selected one of said identifying words, the output of said first coincidence circuit being connected to said stop circuit for stopping said magnetic tape at a particular record so that said record can be processed by said computer when said off-line tape unit is connected to operate on-line with said computer.

5. The digital computer system recited in claim 4 and, a counter, the output of said first coincidence circuit being applied to said counter, the output of said counter being connected to said stop circuit so that said tape transport is stopped only after the occurrence of a predetermined number of successive identifying words.

6. The digital computer system recited in claim 4 wherein said identifying words include start-of-record words, each uniquely identifying a particular record and recorded at the beginning of the records with normal tape movement, and end-of-record words recorded at the end of the records with normal tape movement, said end-of-record words all being of like character, said off-line tape unit further including circuitry for stopping said tape transport at the end of a particular record, said system further comprising:

a second coincidence circuit, said two-state devices being connected to said second coincidence circuit so that said second coincidence circuit produces an output upon the occurrence of each of said end-of-record words, and means connected to the outputs of said first and said second coincidence circuits for stopping said tape transport upon the occurrence of an end-of-record word after the occurrence of a particular start-of-record word.

7. A magnetic tape search unit for use with a magnetic tape transport including a stop circuit in searching for selected records of digital data recorded on magnetic tape, each record including a unique identifying word, said unit comprising:

a plurality of two-state devices for connection to individual ones of the reading heads associated with said tape transport so that each one of said two-state devices is set to a particular state in accordance with a particular bit of data being read from said magnetic tape, a first coincidence circuit, and manually operable switch means for applying the outputs of selected ones of said two-state devices to said first coincidence circuit so that said first coincidence circuit produces an output upon the reading of a selected one of said identifying words, the output of said first coincidence circuit for connection to said stop circuit for stopping said tape transport at a selected record so that said record is immediately ready for processing by a digital computer when said tape transport is connected to operate on-line with said computer.

8. The magnetic tape search unit of claim 7 further including a counter, the output of said first coincidence circuit being applied to said counter, the output of said counter for connection to said stop circuit so that said tape transport is stopped only after the occurrence of a predetermined number of successive identifying words.

9. The magnetic tape search unit of claim 7 wherein said identifying words include start-of-record words uniquely identifying each record and recorded at the beginning of the records with normal tape movement and end-of-record words recorded at the end of the records with normal tape movement, said end-of-record words all being of like character, said magnetic tape search unit further including circuitry for stopping said tape transport at the end of a selected record, comprising:

a second coincidence circuit, the outputs of said two-state devices for connection to said second coincidence circuit so that said second coincidence circuit produces an output upon the reading of each of said end-of-record words, and means connected to the outputs of said first and said second coincidence circuits for activating the stop circuit of said tape transport upon the occurrence of an end-of-record word after the occurrence of a selected start-of-record word.

References Cited

UNITED STATES PATENTS

| | | | |
|---|---|---|---|
| 3,343,132 | 9/1967 | Hanson et al. | 340—172.5 |
| 2,900,132 | 8/1959 | Burns et al. | 235—61.7 |
| 2,967,296 | 1/1961 | Chien et al. | 340—172.5 |
| 3,214,736 | 10/1965 | Glaser | 340—172.5 |
| 3,307,153 | 2/1967 | Bauer | 340—172.5 |

ROBERT G. BAILEY, Primary Examiner

ROGER M. RICKERT, Assistant Examiner

U.S. Cl. X.R.

340—174.1

PO-1050
(5/69)

UNITED STATES PATENT OFFICE
CERTIFICATE OF CORRECTION

Patent No. 3,467,949 Dated September 16, 1969

Inventor(s) Earl Moore

It is certified that error appears in the above-identified patent and that said Letters Patent are hereby corrected as shown below:

Column 2, line 13, "nvention" should read --invention--; line 52, "understoood" should read --understood--. Column 5, line 7, after "output", "of" should read --on--; line 66, "coil 19" should read --coil 59--. Column 8, line 28, "a level should read --a 1 level--. Column 9, lines 9 and 10, "transisor" should read --transistor--; line 10, "ends" should read --tends--; line 12, "caued" should read --caused--; line 5[illegible] after "Pilot lamp" insert --209--. Column 11, line 52, before "second" insert --said--.

SIGNED AND
SEALED
APR 28 1970

(SEAL)
Attest:

Edward M. Fletcher, Jr.
Attesting Officer

WILLIAM E. SCHUYLER, JR.
Commissioner of Patents